United States Patent
Talwar et al.

(10) Patent No.: US 7,644,153 B2
(45) Date of Patent: Jan. 5, 2010

(54) RESOURCE ALLOCATION MANAGEMENT IN INTERACTIVE GRID COMPUTING SYSTEMS

(75) Inventors: Vanish Talwar, Palo Alto, CA (US); Sujoy Basu, Mountain View, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 922 days.

(21) Appl. No.: 10/632,333

(22) Filed: Jul. 31, 2003

(65) Prior Publication Data

US 2005/0027863 A1 Feb. 3, 2005

(51) Int. Cl.
G06F 15/173 (2006.01)
(52) U.S. Cl. .................. 709/224; 709/226; 709/223; 370/229
(58) Field of Classification Search .......... 709/226–229
See application file for complete search history.

(56) References Cited

U.S. PATENT DOCUMENTS

| | | | | |
|---|---|---|---|---|
| 6,473,794 B1 * | 10/2002 | Guheen et al. | ............... | 709/224 |
| 6,728,748 B1 * | 4/2004 | Mangipudi et al. | .......... | 709/226 |
| 6,823,385 B2 * | 11/2004 | McKinnon et al. | .......... | 709/226 |
| 6,917,628 B2 * | 7/2005 | McKinnin et al. | ........... | 709/226 |
| 6,925,493 B1 * | 8/2005 | Barkan et al. | ................ | 709/223 |
| 6,970,902 B1 * | 11/2005 | Moon | ......................... | 709/226 |
| 7,058,704 B1 * | 6/2006 | Mangipudi et al. | .......... | 709/226 |
| 7,096,266 B2 * | 8/2006 | Lewin et al. | ................. | 709/226 |
| 7,284,054 B2 * | 10/2007 | Radhakrishnan | ............ | 709/226 |
| 7,305,431 B2 * | 12/2007 | Karnik et al. | ............... | 709/226 |
| 7,310,673 B2 * | 12/2007 | Zhu et al. | .................... | 709/226 |
| 7,426,471 B1 * | 9/2008 | Briscoe et al. | ................ | 705/52 |
| 2002/0013832 A1 * | 1/2002 | Hubbard | ..................... | 709/226 |
| 2004/0221038 A1 * | 11/2004 | Clarke et al. | ................ | 709/226 |
| 2006/0294238 A1 * | 12/2006 | Naik et al. | .................. | 709/226 |

OTHER PUBLICATIONS

Berstis, Viktors. Fundamentals of Grid Computing. Nov. 11, 2002. Redbooks Paper, IBM Corporation. <http://www.redbooks.ibm.com/redpapers/pdfs/redp3613.pdf>.*
Cox, S.J. et al. "Grid Services in action: Grid Enabled Optimisation and Design Search." Proceedings of the 11th IEEE International Symposium on High Performance Distributed Computing. Jul. 2002. p. 413.*

* cited by examiner

*Primary Examiner*—Vivek Srivastava
*Assistant Examiner*—Jeffrey R Swearingen

(57) ABSTRACT

A method and system for the resource allocation for an interactive session on a grid computing system. When a user-request for an interactive session is received, the particular applications needed to be launched in the interactive session are identified, as are resource requirements for the interactive session including processor, network bandwidth, executables and files requirements. A contract is then generated for the interactive session specifying resource allocations and authorizations, and resources for the interactive session are allocated in accordance with the contract. The system includes a distributed resource management node, a contract generation engine, and a contract repository.

15 Claims, 5 Drawing Sheets

| APPLICATION | ACCEPTABLE FRAME RATE | CPU REQUIREMENT (REMOTE DISPLAY SERVER) | | CPU REQUIREMENT (APPLICATION) | | NETWORK BANDWIDTH REQUIREMENT (REMOTE DISPLAY SERVER) | |
|---|---|---|---|---|---|---|---|
| | | LOW | ALLOWED | LOW | ALLOWED | LOW | ALLOWED |
| ENGINEERING | ~10 FRAMES/SEC | 8 % | 10 % | 8 % | 10 % | 15 % | 20 % |
| VIDEO | ~30 FRAMES/SEC | 20 % | 25 % | 20 % | 25 % | 35 % | 40 % |
| GAMES | ~5 FRAMES/SEC | 3 % | 5 % | 3 % | 5 % | 10 % | 15 % |

500

| APPLICATION | ACCEPTABLE FRAME RATE | CPU REQUIREMENT (REMOTE DISPLAY SERVER) | | CPU REQUIREMENT (APPLICATION) | | NETWORK BANDWIDTH REQUIREMENT (REMOTE DISPLAY SERVER) | |
|---|---|---|---|---|---|---|---|
| | | LOW | ALLOWED | LOW | ALLOWED | LOW | ALLOWED |
| ENGINEERING | ~10 FRAMES/SEC | 8 % | 10 % | 8 % | 10 % | 15 % | 20 % |
| VIDEO | ~30 FRAMES/SEC | 20 % | 25 % | 20 % | 25 % | 35 % | 40 % |
| GAMES | ~5 FRAMES/SEC | 3 % | 5 % | 3 % | 5 % | 10 % | 15 % |

RESOURCE ALLOCATION MANAGEMENT IN INTERACTIVE GRID COMPUTING SYSTEMS

FIELD OF THE INVENTION

The present invention relates generally to grid computing systems, and more specifically, to methods and systems for managing the resource allocation to enable interactive sessions on grid computing systems.

BACKGROUND OF THE INVENTION

Grid computing is a form of computer networking. Whereas conventional computer networks focus on communication between devices, grid computing typically harnesses the processing power of multiple computers within a network, and can thus be used for solving problems which are too intensive for any stand-alone machine. Grid computing also involves the sharing of computer resources. A single computer user whose normal requirements for computer processing power are fairly minor may occasionally have more substantial needs, and the existence of a computer grid enables the user to "borrow" external computer resources for a period of time.

Grid computing has to date typically been applied to scientific or technical problems that require a large number of computer processing cycles or access to large amounts of data. An example of a grid computing project is the SETI @ Home project, in which computer users connected to the Internet donate the unused processing power of their computers to process data associated with signals coming from outer space, to help the search for signs of extraterrestrial life. In a typical grid computing application, a large problem is divided and farmed out to a large number of computers, before the results are returned and collated. Grid computing can be confined to the network of computer workstations within a corporation or it can be a public collaboration. Whereas the Internet enables the exchange of information, grid computing enables the exchange of computer power, data storage, and access to large databases, without users having to search for these resources manually. However, existing systems and methods, have not fully addressed the issues relating to grid computing. Currently unresolved issues include the enabling of interactive sessions on a grid computer network, and appropriate methods for controlling and managing the resource allocation.

SUMMARY OF THE INVENTION

In brief, the present invention provides a method and system for the resource allocation for an interactive session on a grid computing system. When a user request for the interactive session is received, applications to be launched in the interactive session are identified, as are resource requirements for the interactive session including processor, network bandwidth, executables and files requirements. A contract is then generated for the interactive session specifying resource allocations and authorizations, and resources for the interactive session are allocated in accordance with the contract. The system of the present invention includes in one embodiment a distributed resource management node, a contract generation engine, and a contract repository.

The use of contracts in accordance with the invention permits appropriate control and management of interactive sessions in a grid computing system. It also addresses scalability issues in terms of grid-users, accounts, policies, resources, contracts in grid computing systems.

It is to be understood that other aspects of the present invention will become readily apparent to those skilled in the art from the following detailed description where, simply by way of illustration, example embodiments of the invention are shown and described. As will be realized, the invention is capable of other and different embodiments, and its several details are capable of modifications in various respects, all without departing from the invention. Accordingly, the drawings and description are to be regarded as illustrative in nature and not as restrictive.

DETAILED DESCRIPTION

Figure 1:
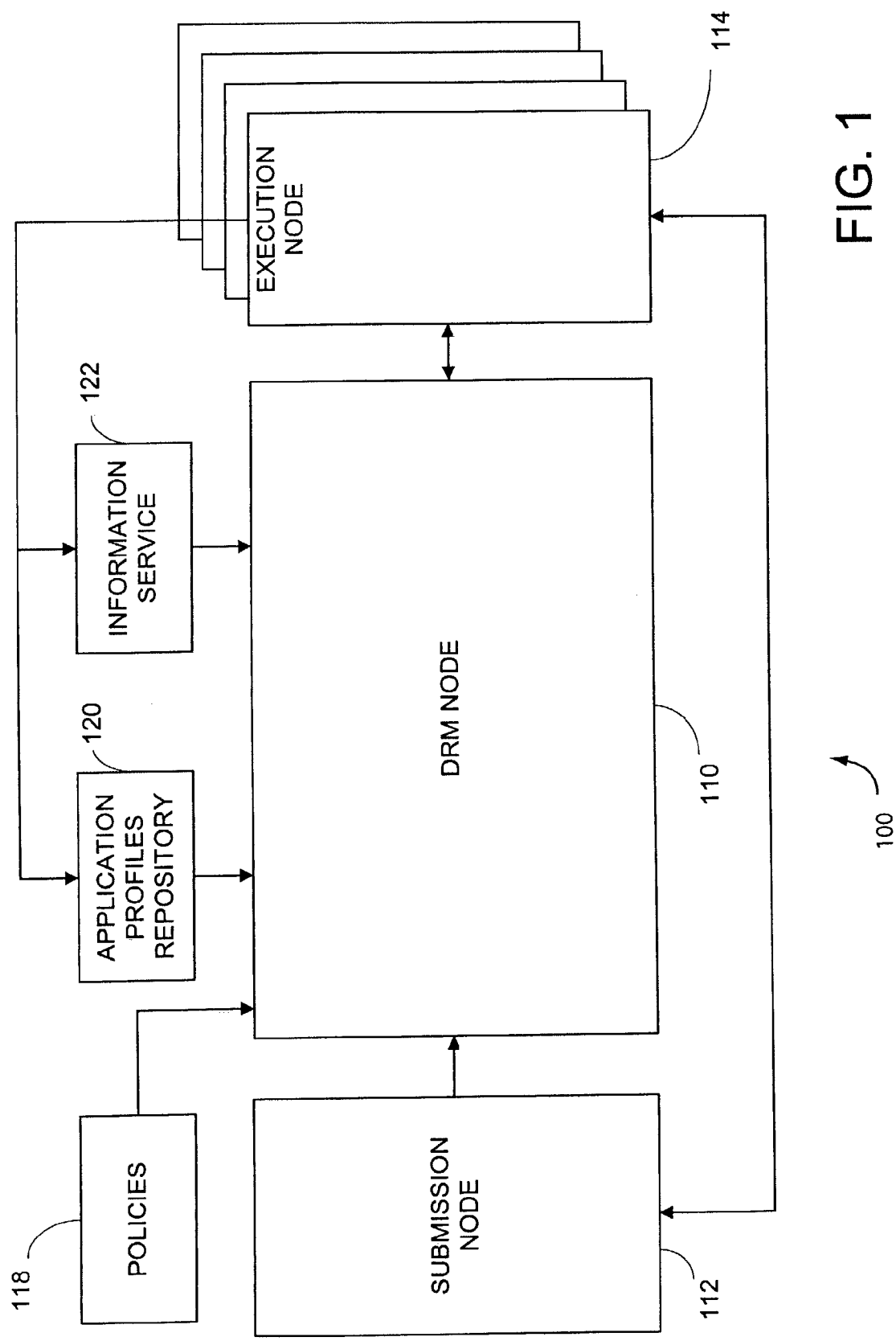
FIG. 1 is a functional block diagram of an operating environment of a grid computing system embodiment of the present invention.

FIG. 1 represents grid computing system embodiment of the present invention, and is referred to herein by the general reference numeral 100. Grid computing system 100 includes a distributed resource management (DRM) node 110, one or more submission nodes 112, and an execution nodes 114. The DRM node 110 receives input from one or more policies 118, one or more application profile repositories 120, and an information service 122. Such information service 122 stores information about resources in the system. The application profile repositories 120 store application profiles. The distributed resource management framework is distributed across the submission nodes 112, the DRM node 110, and the execution nodes 114. The user may submit requests through the one or more submission nodes 112.

In one application of the grid computing system 100, the application domain is extended to include graphical, interactive sessions to remote nodes. An end-user submits job requests through a submission node and is given access to a remote execution nodes for graphical, interactive use. The end-user in the interactive grid computing system may create a global session to the remote execution node during which it can launch multiple application sessions. The global session may be provided by exporting the desktop environment of the remote resource for a certain period of time. Through the desktop environment, the user can then launch multiple applications and interact with them. These operations may be done through a command line shell, through icons on the desktop, or any other suitable execution process. More specifically, this above-described situation may include hierarchical interactive sessions; a global session through the desktop environment, and per-application sessions within the global sessions.

A global interactive session is an association between an end-user and a remote execution node, wherein the end-user interacts with the remote execution node to launch one or more applications, and subsequently interacts with the launched applications through per-application sessions. One example of a global interactive session is the virtual network computing (VNC) remote display session wherein the graphical desktop of the remote node is exported. In one embodiment, the global interactive sessions are graphical, but they may also occur with text only applications or any other desired interface.

A per-application interactive session for an application executing on the remote execution node is the association between the end-user and the executing application, wherein the end-user interacts directly with the application. The per-application interactive session occurs in the context of a global interactive session. In one embodiment, the per-application interactive sessions are graphical, but they may also occur with text only applications or any other desired interface.

In one embodiment of the present invention, an end-user submits requests for interactive sessions to the DRM node. The DRM node then matches the user's requirements, based on the submitted interactive session request, with the available resources, and allocates a remote execution node for interactive use. The end-user then interactively launches applications directly on the remote execution node and interacts with the launched applications. The interaction is controlled through a controlled shell, controlled desktop, and/or monitoring/management agents. The controlled shell, desktop, and management agents may be driven through authorization policies, which, in one embodiment, are access control lists. The authorization policies specify the allowed list of executables, files, network interfaces, and IP addresses for the particular global session. The interactive session is also subject to the service level agreements (SLA). The SLA's specify, among other information, the CPU and network bandwidth requirements for the session. The authorization policies and the SLA's for a session as may be referred to as contracts.

In one embodiment of the interactive grid computing system, the contract generation engine is provided as a mechanism to automate the generation of the contracts. The generated contracts are associated with classes of dynamic accounts. Whenever a dynamic account is assigned to a user, the corresponding contract associated with the dynamic account class is used to bind the users' session. In one embodiment, the contract generation engine is used offline as a tool by the system administrator to generate authorization policy files and SLA's, which are stored in a contract repository. In another embodiment, the contract generation engine is used to generate the contracts dynamically in an interactive grid computing system based on the list of applications specified by the end-user.

As used in this specification, an engine may be, for example, a computer program, application, process, function, or set of computer executable commands that performs a function for other programs. An engine can be a central or focal program in an operating system, subsystem, or application program that coordinates the overall operation of other programs and engines. An engine may also describe a special-purpose program that includes one or more algorithms or uses rules of logic to derive an output. The term "engine" is not limited to the above examples but is intended to inclusively describe computer-executable programs.

FIG. 1 represents a distributed resource management (DRM) embodiment of the present invention, and is referred to herein by the general reference numeral 200. Such DRM node includes a contract generation engine 201, a contract repository 202, a DRM interface 204, a user membership directory 206, and a grid scheduler 208. The DRM interface 204 receives the user request 210. The grid scheduler 208 outputs an admission control decision 212. In one embodiment, the contract generation engine 200 generates the contracts for the interactive sessions in the interactive grid computing system. The inputs to the contract generation engine 200 include (1) the dynamic account class name under consideration with its associated policies, (2) the list of applications specified for a user assigned this dynamic account, (3) the contract templates, (4) application profiles, and (5) policies. The contract generation engine 200 outputs the contract in the form of the authorization policy files and the SLA's, which are stored in the contract repository 202.

Figure 3:
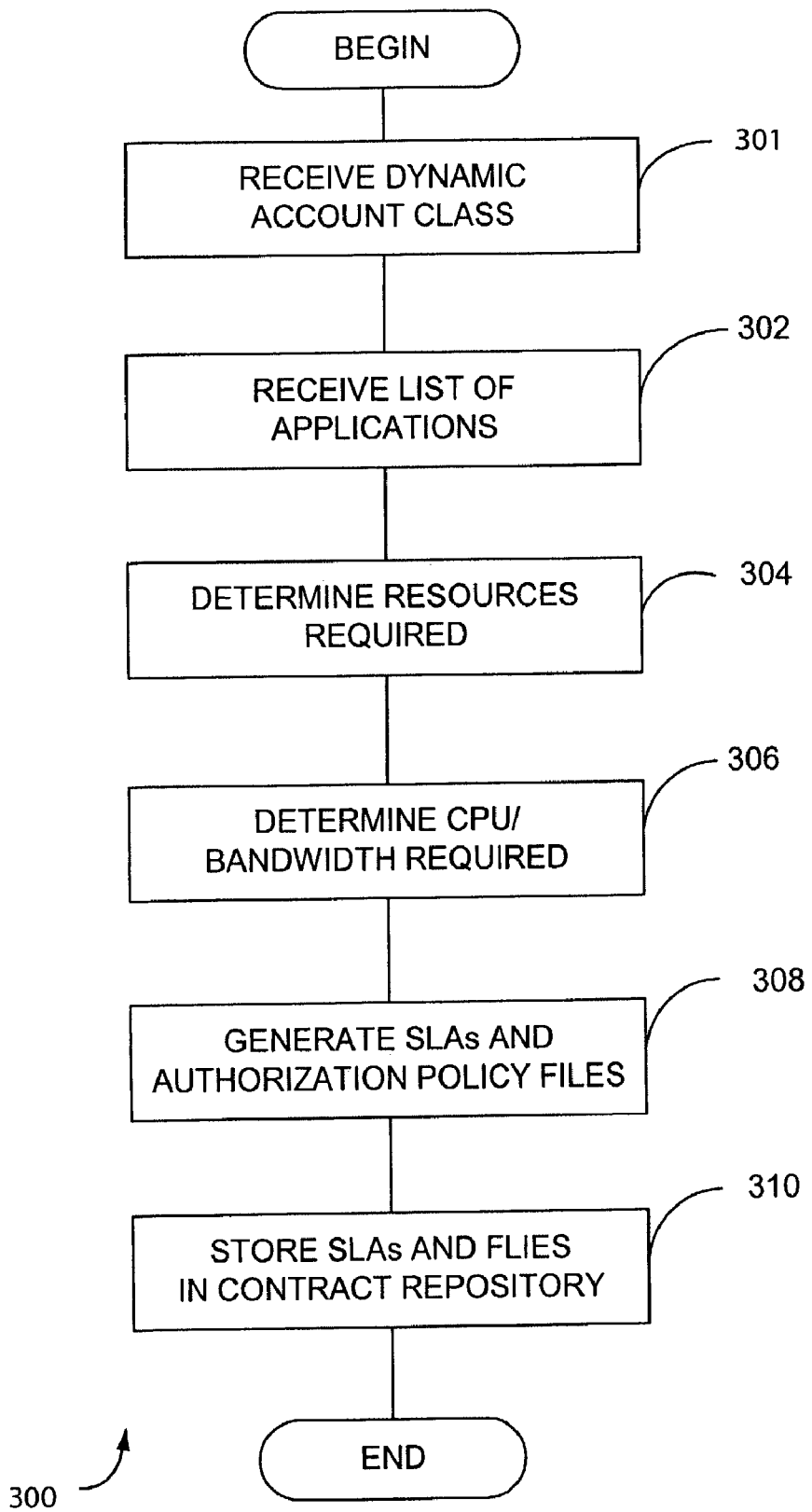
FIG. 3 is a flow chart of a contract generation engine process embodiment of the present invention.

FIG. 3 represents a process embodiment of the present invention, and is referred to herein by the general reference numeral 300, e.g., for execution on contract generation engine 200. In step 301, the contract generation engine reads in a name of a dynamic account class under consideration, along with associated policies. In step 302, the contract generation engine reads in a list of applications specified for a user of a considered dynamic account class. In a offline mode, a list is specified by a system administrator. Otherwise, the list is specified by the end-user in a job request. In step 304, using the information provided in steps 300 and 302, and based on the provided policies, a contract generation engine determines the executables, files, network interfaces, IP addresses that would be required for the users' requested session, as a controlled user and controlled super user respectively. In step 306, also using the information provided in steps 300 and 302, and based on any provided policies, the contract generation engine determines any CPU, network bandwidth required for a user's session. This is achieved as follows:

a. for each of the allowed applications, determine the class of applications that the requested application belongs to. Obtain from the application profiles, the CPU and bandwidth usage requirement for this application; and
b. estimate the total CPU and network bandwidth required for all the listed applications using the values from (a). This estimation is performed using some execution order of applications and/or based on policies.

In step 308, the authorization policy files and SLA's are generated using the information from steps 304 and 306, and using appropriate templates. The format of the generated contracts may be driven by the policies. The authorization policy files are generated for controlled user and controlled super user accounts. In step 310, the generated authorization policy files and SLA's are stored in the contract repository 202.

An example XML authorization policy file, generated by the contract generation engine for dynamic account class 'A' is as follows:

```
<!-- Dynamic Account Class 'A' Controlled User -->
<acl>
<subject>
<group> CLASS A </group>
<user_account> CONTROLLED USER </user_account>
</subject>
<!-- Allowed list of files -->
<target>
<name>files </name>
<list>
<file> "$HOME/*" </file>
<file> "/usr/local/engg/examples/*" </file>
<file> "/usr/local/mcad/include/*" </file>
<file> "/usr/include/*" </file>
<file> "/etc/*" </file>
</list>
<action name= "read/write" permission= "grant" />
</target>
<!-- Allowed list of IP addresses for connection -->
```

-continued

```
<target>
<name>IP addresses </name>
<list>
<ip_address> "12.9.79.*" </ip_address>
<ip_address> "12.9.72. *" </ip_address>
<ip_address> "192.3.56. 68" </ip_address>
<ip_address> "12.5.73.123" </ip_address>
</list>
<action name "network access" permission= "grant" constraint= "HTTP Port 80 connection" />
</target>
</acl>
```

An example SLA, in XML format, generated by the contract generation engine for dynamic account class 'A' is as follows:

```
<!-- SLA for Dynamic Account Class 'A' -->
<SLA>
<! -- SLA Title -->
<Title>
CLASS A SESSION SLA
</Title>
<!--SLA ID-->
<ID>
3054_CLASSA
</ID>
<!-- Maximum and Minimum CPU Allocation -->
<ALLOCATED_CPU_PERCENTAGE>
<MIN>15 </MIN>
<MAX> 30 </MAX>
</ALLOCATED_CPU_PERCENTAGE>
<!-- Maximum and Minimum Network Bandwidth Allocation -->
<ALLOCATED_NETWORK_PERCENTAGE>
<MIN>40 </MIN>
<MAX> 70 </MAX>
<!ALLOCATED_NETWORK_PERCENTAGE>
</SLA>
```

The above example includes only CPU and network bandwidth fields. However, other fields may similarly be included, e.g., memory and disk usage.

The contract generation engine may also be used to generate contracts dynamically in the interactive grid computing system. In such a case, the contract generation engine 200 is invoked dynamically by the interactive grid DRM module. The newly generated contracts can then be optionally stored in the contract repository 202 for future use.

Figure 2:
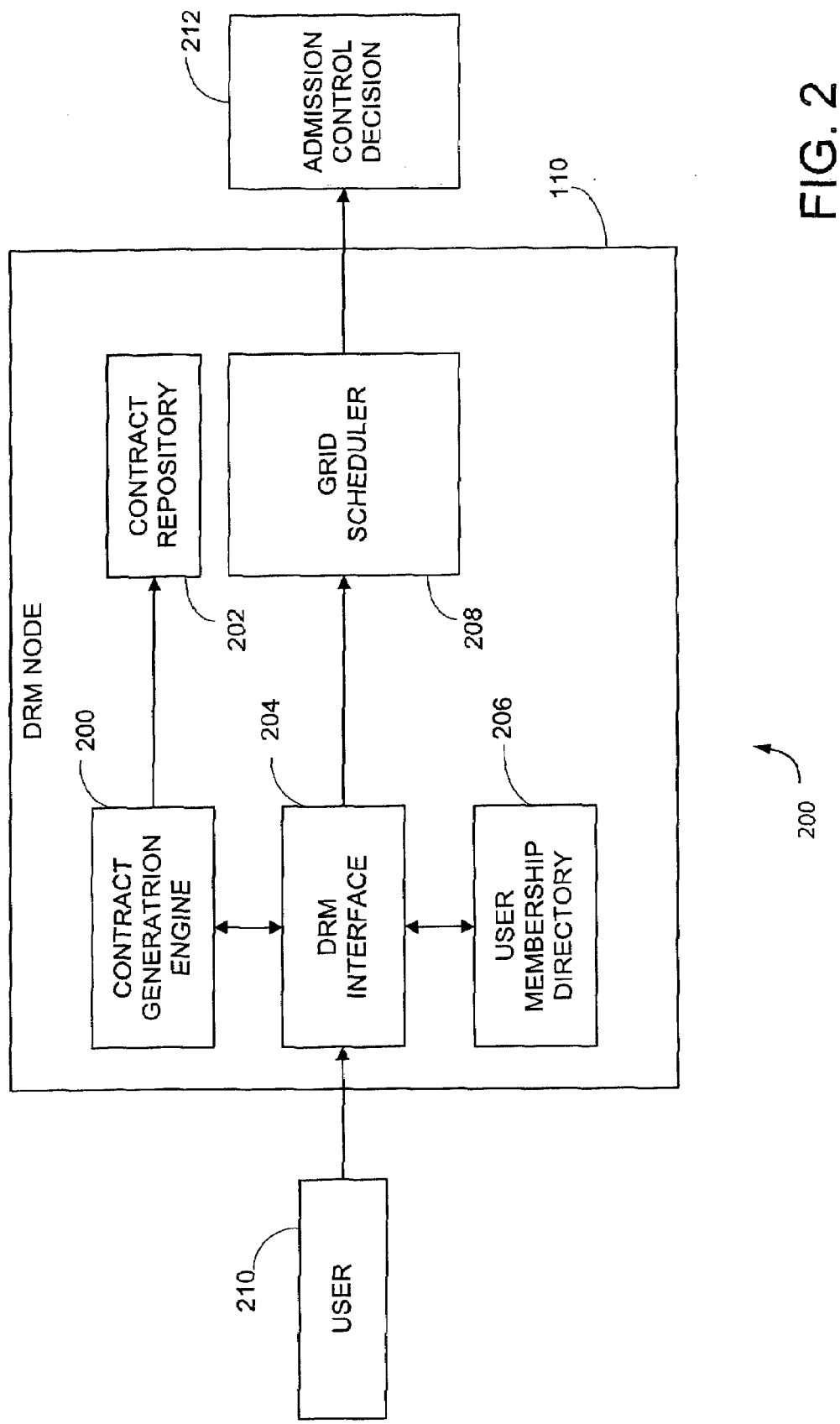
FIG. 2 is a detailed process diagram of a distributed resource management (DRM) node embodiment of the present invention.

Referring again to FIG. 2, the following steps are taken in an example dynamic contract generation process. The end-user submits request for an interactive session to the grid DRM. The end-user also specifies the list of applications desired for the interactive session. The dynamic account class to which the user must be assigned is determined from the user membership directory. The contract generation engine 200 is then invoked to generate the contracts for this session dynamically. The generated contract can also now be optionally stored in the contract repository 202. The generated contract is then submitted to the grid scheduler 208 along with the user's request. The contract may also be optionally sent to the user for the user's record. The grid scheduler 208 determines the appropriate execution node for the user's session. The grid scheduler 208 dispatches the job to the chosen execution node along with the contract. The user is allocated the appropriate dynamic account on the execution node. The session is started with this allocated account on the chosen execution node, and the contract is enforced for this session.

Figure 4:
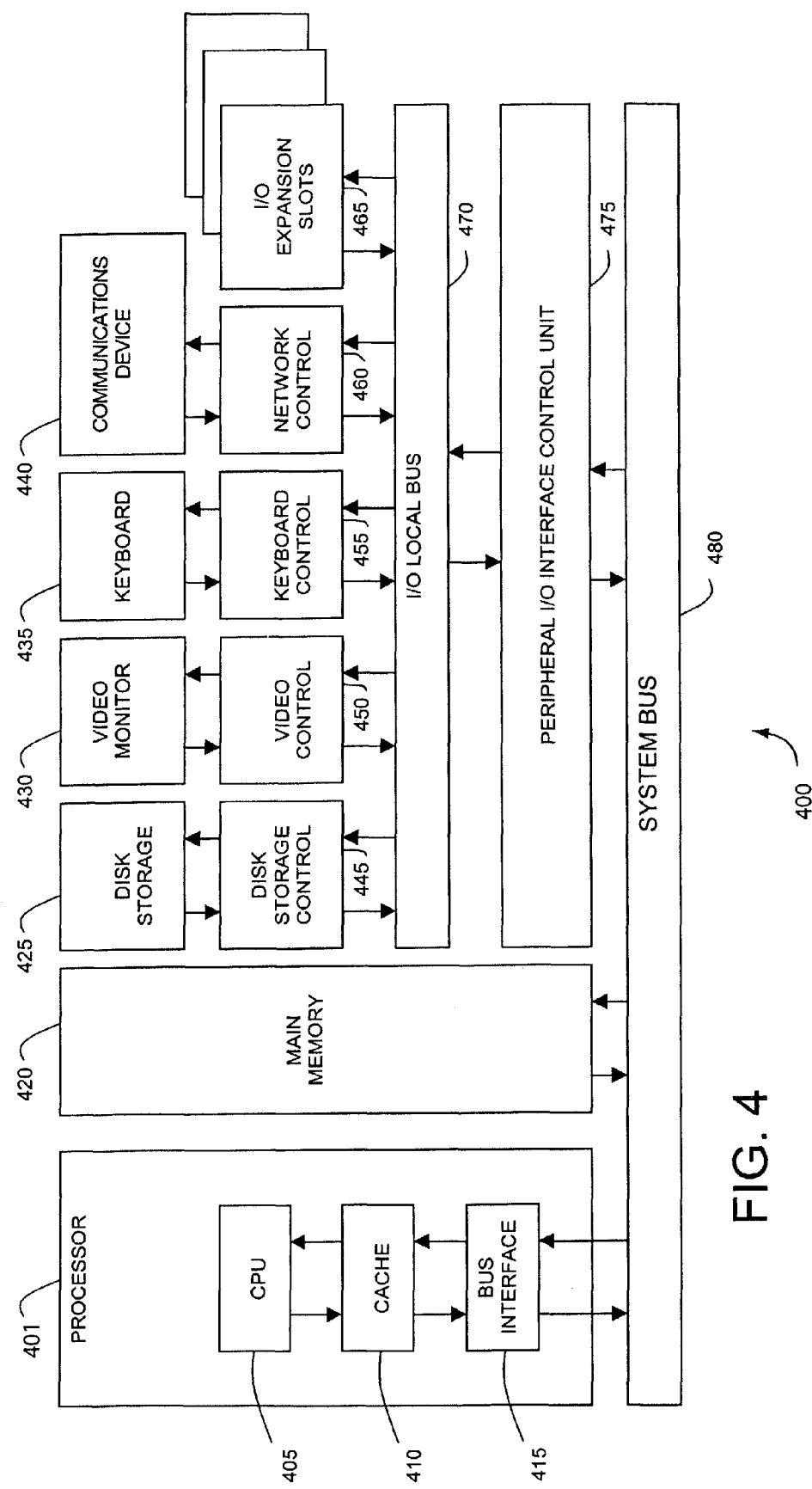
FIG. 4 is a block diagram of an architecture for a general purpose computer embodiment of the present invention.

FIG. 4 is a general purpose computer 400 suitable for performing the functions of the grid computing system and associated applications. The illustrated general purpose computer may also be suitable for running other network applications. A microprocessor 401, including of a central processing unit (CPU) 405, a memory cache 410, and a bus interface 415, is connected via a system bus 480 to a main memory 420 and an Input/Output (I/O) control unit 475. The I/O interface control unit 475 is connected via an I/O local bus 470 to a disk storage controller 445, video controller 450, a keyboard controller 455, a network controller 460, and I/O expansion slots 465. The disk storage controller 445 is connected to the disk storage device 425. The video controller is connected to the video monitor 430. The keyboard controller 455 is connected to the keyboard 435. The network controller 460 is connected to the communications device 440. The communications device 440 is adapted to allow the network inventory adapter operating on the general purpose computer to communicate with a communications network, such as the Internet, a Local Area Network (LAN), a Wide Area Network (WAN), a virtual private, network, or a middleware bus, or with other software objects over the communications network.

Computer program instructions for implementing the grid computing system may be stored on the disk storage device 425 until the processor 400 retrieves the computer program instructions, either in full or in part, and stores them in the main memory 420. The processor 400 then executes the computer program instructions stored in the main memory 420 to implement the features of grid computing system. The program instructions may be executed with a multiprocessor computer having more than one processor.

The general purpose computer illustrated in FIG. 4 is an example of a grid computing system. The grid computing system, and any other associated programs, applications, components, and operations, may also run on a plurality of computers, a network server, or other suitable computers and devices.

Figure 5:
FIG. 5 is an example application profile for a contract generation embodiment of the present invention.

FIG. 5 is an example application profile 500 for contract generation embodiment of the present invention. Application profile 500 may be used as input to the contract generation engine 200.

The previous description of the example embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. The present embodiments should be considered in all respects as illustrative and not restrictive. Accordingly, the present invention is not intended to be limited to the embodiments described above, but is to be accorded the widest scope consistent with the principles and novel features disclosed herein.

What is claimed is:

1. A method for resource allocation management for an interactive session on a grid computing system, comprising:
   assigning a user class to an end user;
   storing the user class for the end user in a user membership directory;
   receiving an end user request for an interactive session with the end user after the user class is assigned to the end user;
   in response to receiving the end user request, generating a contract for the interactive session, wherein the contract includes a service level agreement with the end user; and allocating resources for the interactive session in accordance with the service level agreement;
wherein generating the contract for the interactive session includes:
identifying application programs needed by the end user to be launched in said interactive session;
determining the user class to which the end user belongs by retrieving the user class from the membership directory;
consulting one or more user class authorization policy files to determine resource allocation policies for the end user's user class;
for each of the application programs, obtaining from an application profile for the application program, CPU and bandwidth requirements for the application program;
estimating a total CPU and bandwidth requirement for the application programs from the CPU and bandwidth requirements determined for each application program and based on an order of execution of the application programs and the resource allocation polices for the end user's user class;
generating the contract for the interactive session using the end user's class, the resource allocation policies for the end user's class, and the estimated total CPU and bandwidth requirement.

2. The method of claim 1, wherein:
the step of identifying application programs to be launched in the interactive session includes consulting a user directory to identify application programs which the end user is authorized to use.

3. The method of claim 1, further comprising:
consulting one or more application profile files to determine the application profiles for the application programs.

4. The method of claim 1, wherein:
the step of generating said contract includes generating an authorization policy.

5. The method of claim 1, further comprising:
monitoring the interactive session to ensure compliance with terms of the contract.

6. The method of claim 1, wherein:
the step of allocating resources for the interactive session is performed by a grid scheduler which receives the end user request and the contract.

7. A system for managing resource allocation for an interactive session on a grid computing system, the system comprising:
one or more processors;
one or more memories coupled to the one or more processors; and
program instructions stored in the one or more memories, the one or more processors for executing the program instructions including:
assigning a user class to an end user;
storing the user class for the end user in a user membership directory;
receiving an end user request for an interactive session with the end user after the user class is assigned to the end user;
in response to receiving the end user request, generating a contract for the interactive session, wherein the contract includes a service level agreement with the end user; and
allocating resources for the interactive session in accordance with the service level agreement;
wherein generating the contract for the interactive session includes:
identifying applications for the end user to be launched in the interactive session;
determining the user class to which the end user belongs by retrieving the user class from the membership directory;
consulting one or more user class authorization policy files to determine resource allocation policies for the end user's user class;
for each of the applications, obtaining from an application profile for the application, CPU and bandwidth requirements for the application program;
estimating a total CPU and bandwidth requirement for the applications from the CPU and bandwidth requirements determined for each application and based on at least one of an order of execution of the applications and the resource allocation polices for the end user's user class;
generating the contract for the interactive session using the end user's class, the resource allocation policies for the end user's class, and the estimated total CPU and bandwidth requirement.

8. The system of claim 7, further comprising:
a user directory which includes for the end user a list of applications which the end user is authorized to use.

9. The system of claim 7, further comprising:
an application profiles repository for providing information concerning the application profiles.

10. The system of claim 7, further comprising:
a user class authorization policy repository for providing resource allocation policies for different user classes.

11. The system of claim 7, further comprising:
a grid scheduler which receives the end user request and the contract and performs the step of allocating resources for the interactive session.

12. A system for managing resource allocation for an interactive session on a grid computing system, comprising:
a distributed resource management node, the distributed resource management node including a distributed resource management interface and a grid scheduler, the grid scheduler configured to receive an end user request for an interactive session and output an admission control decision;
a contract generation engine coupled to the distributed resource management node, and in response to the distributed resource management node receiving the end user request, the contract generation engine generates a contract for the interactive session, wherein the contract includes a service level agreement with the end user, wherein the contract generation engine generates the contract by performing the following steps:
assigning a user class to an end user;
after the assigning the user class to the end user, the end user request is received;
identifying applications needed by the end user to be launched in said interactive session;
determining the user class to which the end user belongs from the assigned user class;
consulting one or more user class authorization policy files to determine resource allocation policies for the end user's user class;
for each of the applications, obtaining from an application profile for the application, CPU and bandwidth requirements for the application;
estimating a total CPU and bandwidth requirement for the applications from the CPU and bandwidth requirements determined for each application and based on at least one of an order of execution of the applications and the resource allocation policies for the end user's user class; and generating the contract for the interactive session using the end user's class, the resource allocation policies for the end user's class, and the estimated total CPU and bandwidth requirement; and a contract repository configured to store the service level agreement.

13. The system of claim 12, further comprising:
a user directory which includes for the end user a list of applications which the end user is authorized to use.

14. The system of claim 12, further comprising:
an application profiles repository storing the application profiles.

15. The system of claim 12, further comprising:
a user class authorization policy repository for providing resource allocation policies for different user classes.

* * * * *

UNITED STATES PATENT AND TRADEMARK OFFICE
CERTIFICATE OF CORRECTION

PATENT NO.         : 7,644,153 B2                                                                    Page 1 of 1
APPLICATION NO.    : 10/632333
DATED              : January 5, 2010
INVENTOR(S)        : Vanish Talwar et al.

It is certified that error appears in the above-identified patent and that said Letters Patent is hereby corrected as shown below:

In column 7, line 14, in Claim 1, delete "program." and insert -- program, --, therefor.

Signed and Sealed this

Fifth Day of October, 2010

David J. Kappos
*Director of the United States Patent and Trademark Office*